(12) United States Patent
Zudic et al.

(10) Patent No.: US 10,715,506 B2
(45) Date of Patent: Jul. 14, 2020

(54) METHOD AND SYSTEM FOR MASTER PASSWORD RECOVERY IN A CREDENTIAL VAULT

(71) Applicant: BlackBerry Limited, Waterloo (CA)

(72) Inventors: Ivan Albert Zudic, Kitchener (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 171 days.

(21) Appl. No.: 15/445,308

(22) Filed: Feb. 28, 2017

(65) Prior Publication Data

US 2018/0248859 A1    Aug. 30, 2018

(51) Int. Cl.
| | |
|---|---|
| H04L 29/06 | (2006.01) |
| G06F 21/45 | (2013.01) |
| H04W 12/06 | (2009.01) |
| G06F 21/60 | (2013.01) |

(52) U.S. Cl.
CPC ............. *H04L 63/06* (2013.01); *G06F 21/45* (2013.01); *G06F 21/602* (2013.01); *H04L 63/083* (2013.01); *H04L 63/10* (2013.01); *H04W 12/06* (2013.01); *G06F 2221/2131* (2013.01)

(58) Field of Classification Search
CPC ....... H04L 63/06; H04L 63/10; H04L 63/083; G06F 21/602; G06F 2221/2131; G06F 21/45; H04W 12/06
USPC ........................................................ 713/193
See application file for complete search history.

(56) References Cited

U.S. PATENT DOCUMENTS

| | | |
|---|---|---|
| 8,782,403 B1 | 7/2014 | Satish |
| 9,450,941 B2 | 9/2016 | Hitchcock et al. |
| 2008/0033954 A1* | 2/2008 | Brooks .................... G06F 21/33 |
| 2009/0177761 A1* | 7/2009 | Meyer ................. H04L 67/2819 709/219 |
| 2009/0241201 A1 | 9/2009 | Wooton et al. |
| 2010/0125906 A1 | 5/2010 | Golle et al. |
| 2010/0306821 A1 | 12/2010 | Cathcart et al. |
| 2011/0302406 A1 | 12/2011 | Machani |
| 2013/0198822 A1 | 8/2013 | Hitchcock et al. |
| 2013/0198824 A1* | 8/2013 | Hitchcock ............... G06F 21/00 726/6 |
| 2014/0281571 A1 | 9/2014 | Federspiel |
| 2015/0039908 A1* | 2/2015 | Lee ......................... G06F 21/35 713/193 |
| 2015/0067804 A1 | 3/2015 | Maxwell |
| 2015/0310206 A1 | 10/2015 | Kaplan |

OTHER PUBLICATIONS

European Patent Office, Extended European Search Report on Application No. 18153960.2-1213, dated May 8, 2018.

(Continued)

*Primary Examiner* — Evans Desrosiers
(74) *Attorney, Agent, or Firm* — Moffat & Co

(57) ABSTRACT

A method at a computing device for enabling access to a credential vault if a master password for the credential vault is lost, the method including selecting at least one credential from within the credential vault; encrypting one of the master password or a vault key for the credential vault with the selected at least one credential, thereby creating a recovery file; and storing the recovery file, wherein the selected at least one credential can be used to decrypt the recovery file to enable access to the credential vault.

16 Claims, 10 Drawing Sheets

(56) References Cited

OTHER PUBLICATIONS https://support.1password.com/forgot-master-password/, "If you forgot your Master Password or you can't unlock 1Password", as downloaded on Jan. 24, 2017.

http://lifehacker.com/what-to-do-if-you-lose-the-master-password-to-your-pass-1686432765, "What t Do If You Lose the Master Password to Your Password Manager", as downloaded on Jan. 24, 2017.

* cited by examiner

METHOD AND SYSTEM FOR MASTER PASSWORD RECOVERY IN A CREDENTIAL VAULT

FIELD OF THE DISCLOSURE

The present disclosure relates to credential vaults and in particular relates to credential vaults which are encrypted utilizing a master password.

BACKGROUND

In order to access functionality within an application or service, a user will often be required to provide authentication credentials. For example, the application or service may require a username or password to be provided prior to allowing access to such application or service.

Users typically have many applications or services that they access, and each may require one or more authentication credentials. For example, a user may access online banking and require a first authentication credential, an application storefront which may require a second authentication credential, social media sites which may require further authentication credentials, email services that require further credentials, among others.

In many cases, a user will reuse the same password or other authentication credentials between those sites in order to allow the user to remember such credentials. However, this creates security issues and compromises the user's data if one of such applications or services is breached.

In order to overcome this, users may store credentials in a credential vault. As used herein, a credential vault can be any digital vault that is used to store information for access to an application or service. For example, the credential vault may store a user name and password for each application or service.

The credential vault itself is typically encrypted and requires a decryption key to access contents stored therein. Because such decryption key allows the decryption of the user's credentials for a plurality of applications or services, the password used to generate such decryption key is referred to herein as the master password for the user. Specifically, the master password, when passed through a key derivation function, creates the decryption key for the credential vault.

Typically, the master password is known only to the owner of the credential vault. If the master password is forgotten, then all data within the credential vault is effectively lost.

BRIEF DESCRIPTION OF THE DRAWINGS

The present disclosure will be better understood with reference to the drawings, in which.

DETAILED DESCRIPTION

The present disclosure provides a method at a computing device for enabling access to a credential vault if a master password for the credential vault is lost, the method comprising: selecting at least one credential from within the credential vault; encrypting one of the master password or a vault key for the credential vault with the selected at least one credential, thereby creating a recovery file; and storing the recovery file, wherein the selected at least one credential can be used to decrypt the recovery file to enable access to the credential vault.

The present disclosure further provides a computing device configured for enabling access to a credential vault if a master password for the credential vault is lost, the computing device comprising: a processor; and a user interface, wherein the computing device is configured to: select at least one credential from within the credential vault; encrypt one of the master password or a vault key for the credential vault with the selected at least one credential, thereby creating a recovery file; and store the recovery file, wherein the selected at least one credential can be used to decrypt the recovery file to enable access to the credential vault.

The present disclosure further provides a computer readable medium for storing program instructions for enabling access to a credential vault if a master password for the credential vault is lost, the program instructions, when executed by a processor of a computing device, cause the computing device to: select at least one credential from within the credential vault; encrypt one of the master password or a vault key for the credential vault with the selected at least one credential, thereby creating a recovery file; and store the recovery file, wherein the selected at least one credential can be used to decrypt the recovery file to enable access to the credential vault.

Password recovery for any reliable credential vault is difficult. Any mechanism which allows a remote system or service to reset the password provides cause to question the level of security employed by the service. Specifically, if a service is capable of resetting a password, that service may need to know the master password or some other recovery password or key. This places a significant level of trust in the service operators, and such level of trust may be unwarranted.

Without a remote reset, if a master password is forgotten then typically all data in a credential vault is lost. Specifically, a credential vault can be any password manager or credential storage which is independently encrypted and locked using a key. In accordance with the embodiments described herein, the key for the credential vault in the present disclosure is derived from a master password. When the master password is forgotten, the key to unlock the credential vault cannot, in any computationally acceptable time, be derived, thus rendering the contents of the credential vault inaccessible.

Figure 1:
FIG. 1 is a block diagram showing generation of a vault key from a master password using a key derivation function.

Reference is now made to FIG. 1. As seen in FIG. 1, a method for deriving a vault key to decrypt the credential vault is provided. In particular, a master password 110 may be inputted into a computing device, typically using a user interface in association with the credential vault. As used herein, a computing device may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Master password 110 is passed through a key derivation function 112 to generate vault key 120. Key derivation function 112 may be any function that is used to derive a vault key 120. For example, in some embodiments master password 110 may be lengthened to a minimum length and then passed through a one-way hash function to create the vault key 120. In other embodiments, combinations of padding, salting, and hash functions may be used for key derivation function 112. For example, key derivation function 112 may be the Password-Based Key Derivation Function 1 (PBKDF1), Password-Basked Key Derivation Function 2 (PBKDF2), BCRYPT, SCRYPT, among other options.

Figure 2:
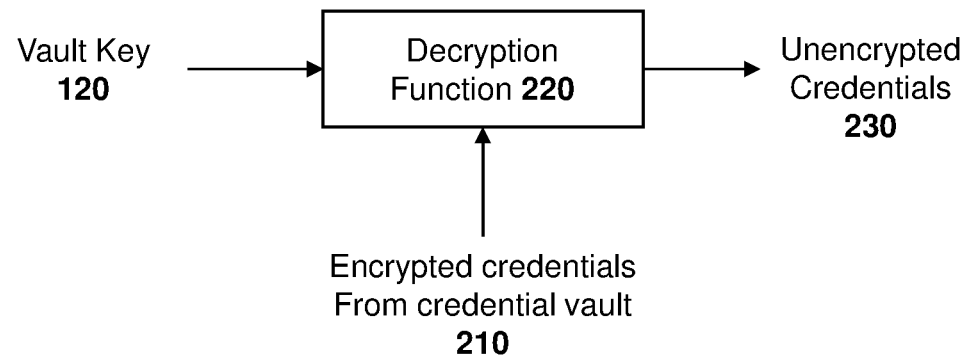
FIG. 2 is a block diagram showing the decryption of contents of a credential vault.

Reference is now made to FIG. 2 which shows a block diagram for the decryption of the credentials within a credential vault.

In particular, the vault key 120, along with the encrypted credentials from the credential vault, as shown with reference numeral 210, are provided to a decryption function 220. The decryption function may be utilized to provide unencrypted credentials 230.

In a secure system, the vault key 120 is not stored anywhere, but rather is derived using the key derivation function 112. Thus, if the master password 110 is forgotten, then it is generally impossible to recreate vault key 120. In this case, the input to decryption function 220 is missing and the ability to obtain the unencrypted credentials 230 is lost.

Figure 3:
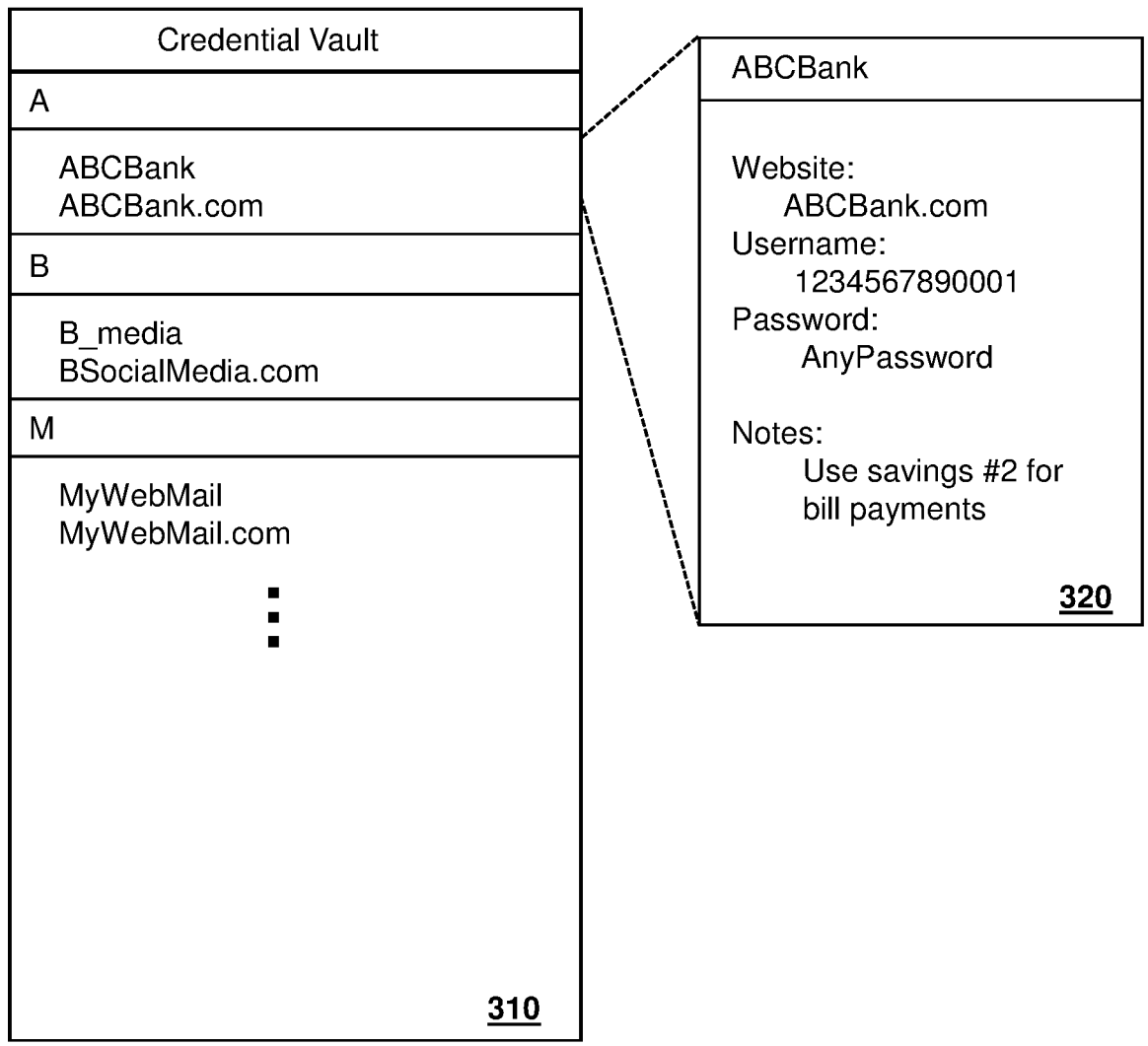
FIG. 3 is an example screenshot showing a credential vault with a plurality of entries, and the selection of one of the entries.

Reference is now made to FIG. 3, which shows screenshots of an example credential vault. However, the example of FIG. 3 is merely provided for illustration purposes and is not meant to limit the present disclosure to any particular credential vault.

In the example of FIG. 3, a credential vault 310 includes a list of applications or services that have credentials stored within the credential vault. Such credentials may include, but are not limited to, usernames, passwords, secure notes, secure lists, card numbers such as credit card, passport, or loyalty card numbers, pictures or other data that a user may want to protect.

When a user selects a particular application or service, information for that application or service may be displayed, as shown with block 320. For example, in FIG. 3 the ABCBank has been selected. The information within such application or service may include the website for the application or service, the user name, the password, notes, among other information.

Thus, once unencrypted, the credential vault application provides access to stored credentials.

The present disclosure provides for recovery of the master password or vault key based on information within the credential vault. Specifically, in accordance with the embodiments described below, one or more recovery files may be created by utilizing information within the credential vault that a user is likely to remember. The use of information within the credential vault provides for recovery without exposing the master password or vault key to a third party. Further, in one embodiment the password recovery may be done without dependence on a remote server.

As provided in more detail below, copies of the master password or vault key that are encrypted with data from within the credential vault can be stored in order to allow for the recovery of the master password or vault key.

Several embodiments are described below. In one embodiment, the user may designate one or multiple entries stored in a credential vault to act as recovery accounts. In this case, the designated entries could be used individually or in combination. For example, if a plurality of entries is specified, each entry could be used in a particular sequence to encrypt a recovery file. In some cases, multiple recovery files using different credentials could also be created, and the user may be able to choose from between multiple recovery questions in order to recover the password.

In a further embodiment, recovery credentials could be chosen randomly by the password recovery mechanism of the credential vault. As described below, the random selection could be done to ensure that a strong password or series of less strong passwords, that when combined form a strong password, are chosen. Such implementation has the benefit of added security, but may come with a cost of the user being less likely to know the password or other credential for the associated application or service if such account is not used frequently.

In another embodiment, recovery credentials could be presented from a list of recently accessed applications or services.

In a further embodiment, recovery credentials could be based on the most frequently used applications or services within the credential vault.

Other examples or combinations of the above may be utilized.

When an entry changes within the credential vault, the recovery mechanism could also update recovery files to reflect the new credentials within the credential vault.

The master password or vault key would therefore be separately encrypted with account passwords or other credentials from within the credential vault. The user would have to know such passwords or credentials in order to recover access to the credential vault.

In various embodiments, the recovery mechanism may use as many credentials from the various applications or services as needed to ensure that the password manager will not unlock until recovery entropy has reached a certain threshold. For example, in one embodiment the entropy may be required to be at least the same or higher than the forgotten master password.

Figure 4:
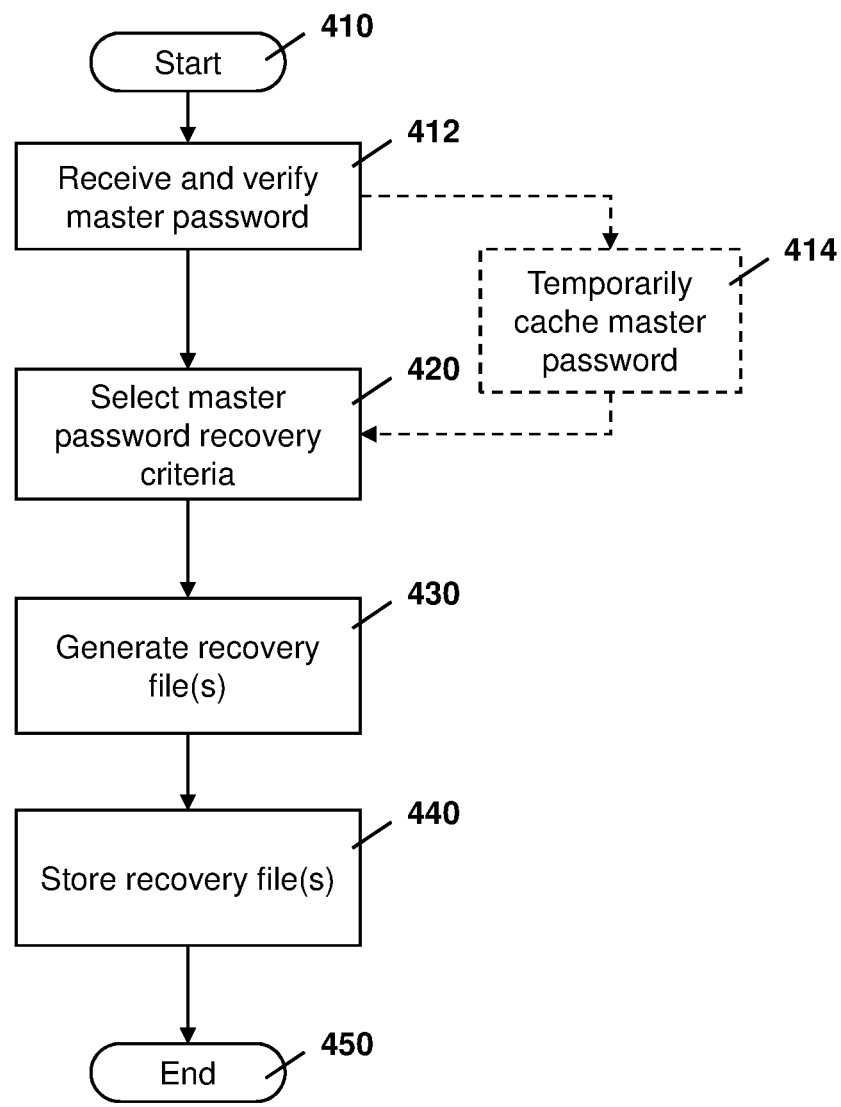
FIG. 4 is a process diagram showing a process for creation and storage of a recovery file.

Reference is now made to FIG. 4. The embodiment of FIG. 4 shows a method for the creation or reconfiguration of a recovery system for a master password or vault key for a credential vault. In particular, the process of FIG. 4 starts at block 410 and proceeds to block 412. At block 412, a computing device receives and verifies a master password. Verification of the master password may include decrypting the vault contents by passing the master password through the key derivation function 112 from FIG. 1.

In one embodiment, the master password and/or the vault key may be temporarily cached, as shown at block 414, in order to facilitate the generation of recovery files.

From either block 412 or block 414, the process proceeds to block 420 at which master password recovery criteria are selected. Various options are available for the master password recovery criteria.

Figure 5:
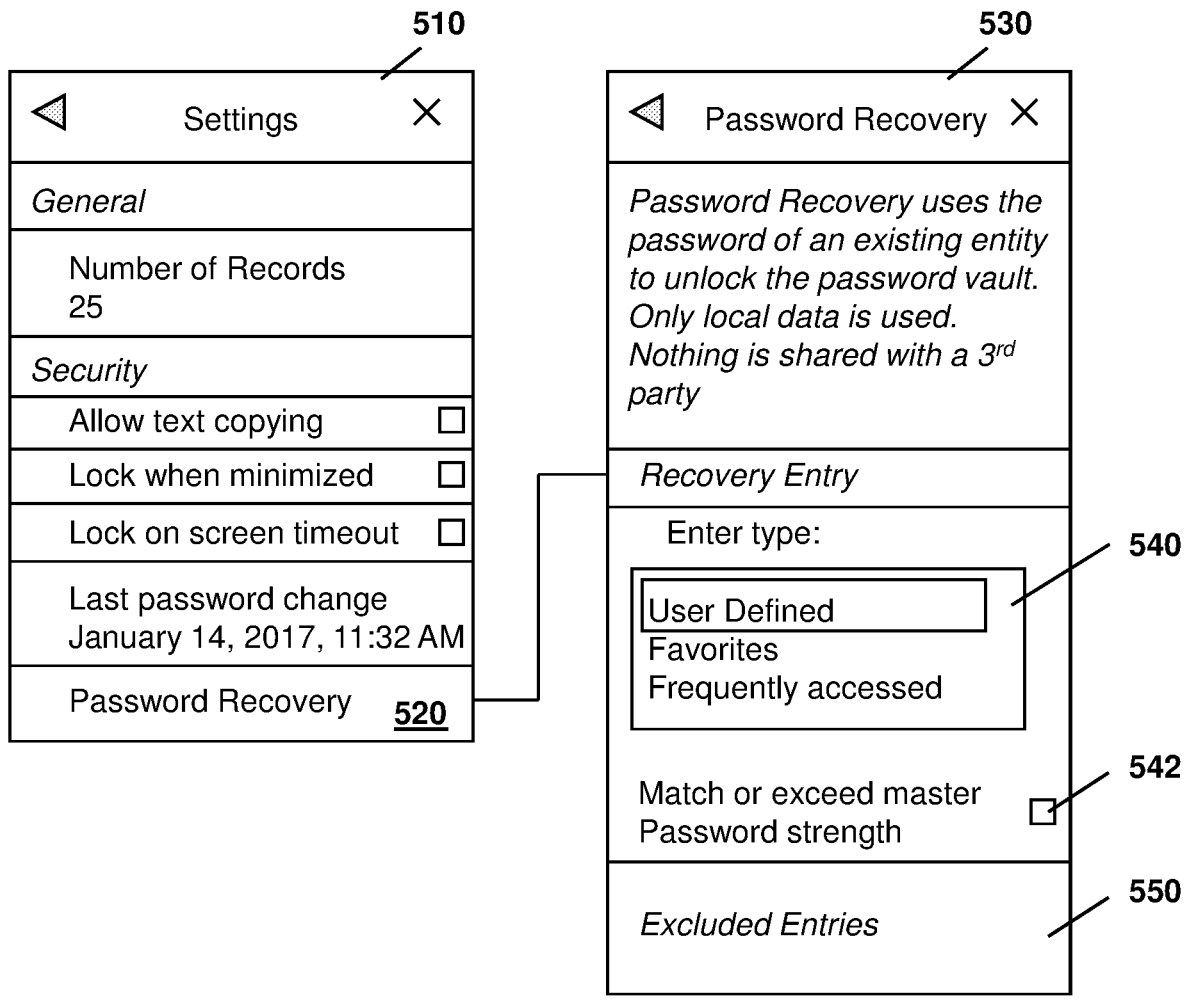
FIG. 5 is an example screenshot showing a configuration interface for configuring password recovery.

For example, referring to FIG. 5, an example user interface is provided for configuring password recovery. In particular, either within or external to the credential vault application, a settings window 510 may be opened.

As seen in settings window 510, various settings for the credential vault may be configured. One of the settings included in settings window 510 is the password recovery selection 520.

Upon opening password recovery selection 520, a password recovery configuration window 530 may be opened. As seen in FIG. 5, the password recovery allows the configuration of the type of credentials used for recovery. For example, in FIG. 5, box 540 shows that the recovery entry may be user defined, may be based on favorites, or may be based on frequently accessed accounts.

A user defined entry may be one or more entries selected by the user. For example, if the user selects a user defined entry in box 540, a further user interface screen (not shown) may be created providing a list of all of the entries within the credential vault. The user may then select one or more of such entries for password recovery.

The selection of the favorites in block 540 may indicate to a computing device that the recovery password should be done based on the applications or services that the user has defined as favorites.

The frequently accessed selection in block 540 may be used to select credentials from applications or services that are the most frequently accessed within the credential vault.

Other options could include random selection, which would allow the password recovery configuration application to randomly select one or more credentials from the credential vault to utilize for password recovery.

In other embodiments, the recovery could be based on the most recently accessed credentials within the credential vault.

Other options are also possible.

As seen in password recovery user configuration window 530, another selection option in the user interface may include an option to match or exceed the master password strength, as shown by box 542. In this case, the password recovery application could evaluate the strength of the credentials selected at block 540 and decide whether the entropy of the credential matches or exceeds the master password strength. If not, the recovery mechanism could prompt the user to add more passwords or credentials to a series of credentials needed for recovery until the strength of the entropy for the recovery meets or exceeds the master password strength.

Further, excluded entries 550 may be defined. Excluded entries may be user selected entries which are not to be used for password recovery. Examples may include accounts which are not very secure and therefore for which the credentials might be derived or guessed easily. In this case, such entries may not be desirable to be used for the recovery and could be excluded from the password recovery mechanism.

In a further embodiment (not shown), credentials may be provided with a strength score. For example, each credential may be given a score out of 100. The strength of each credential can be graded based on factors such as length, number of symbols, uppercase or lowercase letters, whether the password is a common password, whether the credential has sequences, among other factors. For one configuration parameter, a gradient bar may show a user the strength needed for recovery credentials, with an arrow indicating the strength of the credential on the scale.

One setting may be to exclude any records that have a strength less than a threshold, or conversely only include credentials with a strength greater than a threshold.

The user could move the arrow bar to change the minimum threshold. In one embodiment, the user could be presented in real time examples of records that match the selected threshold while the threshold is being changed. Further, in one embodiment, the user selectable arrow may have a floor and/or a ceiling that is configurable by the user or an enterprise administrator, for example.

Other options for configuration parameters or the use of particular credentials within the credential vault are possible.

Referring again to FIG. 4, once the credentials that are to be used for the recovery are found at block 420, the process proceeds to block 430 in which one or more recovery files are created.

Specifically, if only one password is selected from the credential vault at block 420, then a single recovery file is created. The recovery file may comprise encrypting either the master password or the vault key through a symmetric encryption algorithm as shown in FIG. 6.

Figure 6:
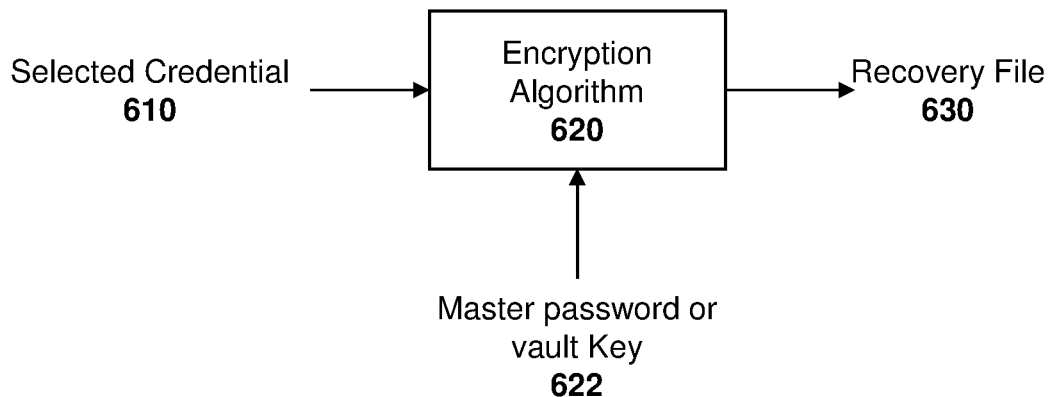
FIG. 6 is block diagram showing creation of a recovery file based on a single credential.

Specifically, as seen in FIG. 6, the selected credential 610 is provided to an encryption algorithm 620, along with the master password or vault key 622. The master password or vault key 622 may come from the temporary cache at block 414, or may be the input based on a prompt to a user, which may then be verified.

The encryption algorithm 620 then creates a recovery file 630. The recovery file may subsequently be decrypted for password recovery utilizing the same selected credential 610.

Figure 7:
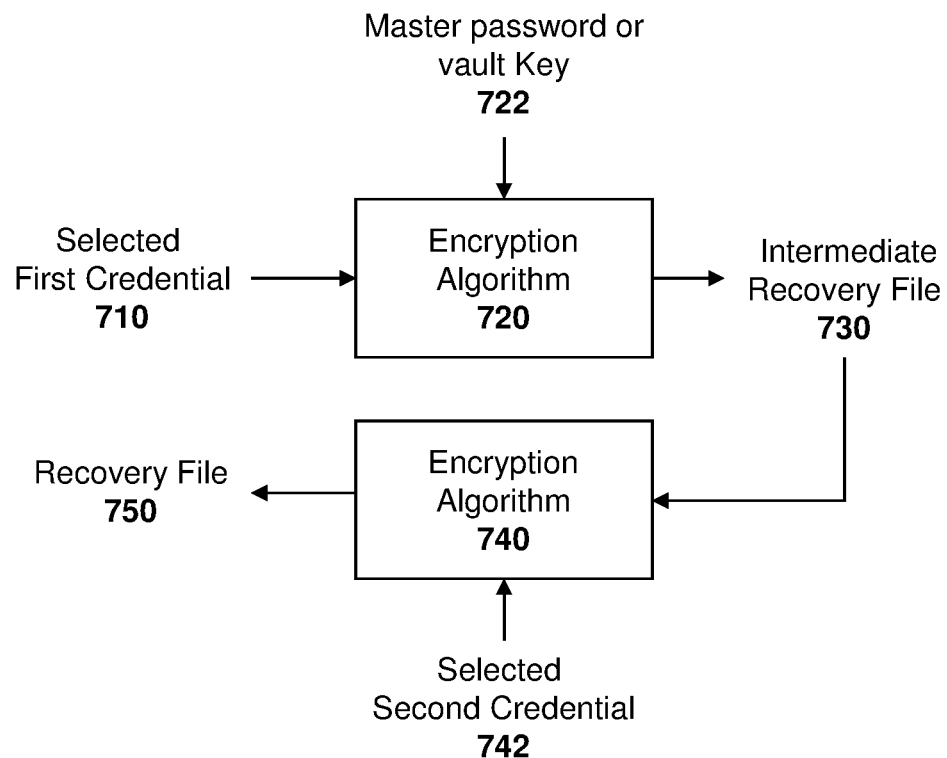
FIG. 7 is a block diagram showing creation of a recovery file based on a plurality of credentials.

In another embodiment the above process may be cascaded utilizing a plurality of credentials. Reference is made to FIG. 7, which shows two cascaded credentials.

In particular, in the embodiment of FIG. 7, a first selected credential 710 is provided to encryption algorithm 720, along with a master password or the vault key 722. The output from encryption algorithm 720 is an intermediate recovery file 730.

The intermediate recovery file 730 is provided to encryption algorithm 740, along with a second selected credential 742. In one embodiment, encryption algorithm 740 is the same as encryption algorithm 720.

The output from encryption algorithm 740 is the recovery file 750.

In order to recover the master password or vault key, recovery file 750 then may be decrypted in a reverse order from the encryption. Thus, the recovery file would first be decrypted with the second selected credential in order to obtain the intermediate recovery file 730. After that, the intermediate recovery file 730 could be decrypted utilizing the selected first credential 710 in order to obtain the master password or vault key.

While the embodiment of FIG. 7 shows only two selected credentials, it could easily be expanded to three or more credentials simply by creating further intermediate recovery files for each encryption algorithm.

In further embodiments, multiple credentials could be combined, for example in a hash function or through concatenation or some other combining process, and then input to the process of FIG. 6. Other examples of combining credentials are also possible.

Further, the embodiments of FIG. 6 or 7 could be utilized to create a plurality of recovery files. Specifically, because a user may not remember the content of every credential within the credential vault, in some embodiments it may be desirable to provide the user with an option to choose one of several recovery passwords. For example, if a user is provided with the option of utilizing one of three different credentials then three separate recovery files could be stored for recovery purposes for the credential vault.

In still further embodiments, other methods could be used to create recovery files using the selected keys. For example, if the vault key could encrypt another key or multiple keys. In other embodiments, public key schemes could be used. Other options are possible.

Referring again to FIG. 4, once the recovery files are generated at block 430, the process proceeds to block 440 in which the recovery file or files are stored. The recovery files may be stored locally along with the credential vault, or may be provided to a server, for example if the credential vault is a remote credential vault. Because the recovery files are encrypted, in some embodiments providing these files to a remote server may still provide sufficient security for a user.

From block 440 the process to block 450 and ends.

The embodiment of FIG. 4 may temporarily cache the master password in order to generate the recovery files. In other embodiments instead of caching the master password, the steps at block 430 may ask for the master password to be re-input. Alternatively, if the vault key is utilized then the vault key may be cached temporarily during the process of FIG. 4.

As indicated with regard to FIG. 5, the entropy of the password may be checked to determine whether or not it matches certain criteria. For example, the entropy of the combination of passwords may be selected to ensure that they meet or exceed the entropy of the original master password. The selection technique may be configured to allow for the selection of additional passwords or credentials from the credential vault if the desired entropy is not met.

For example, if the credentials are user defined, the user may be prompted to add further credentials to cascade with the already selected credentials if the entropy of recovery is deemed too low. Similarly, if the credentials are randomly selected, the random selection may continue to cascade credentials until an entropy threshold is met. Other options are possible.

Figure 8:
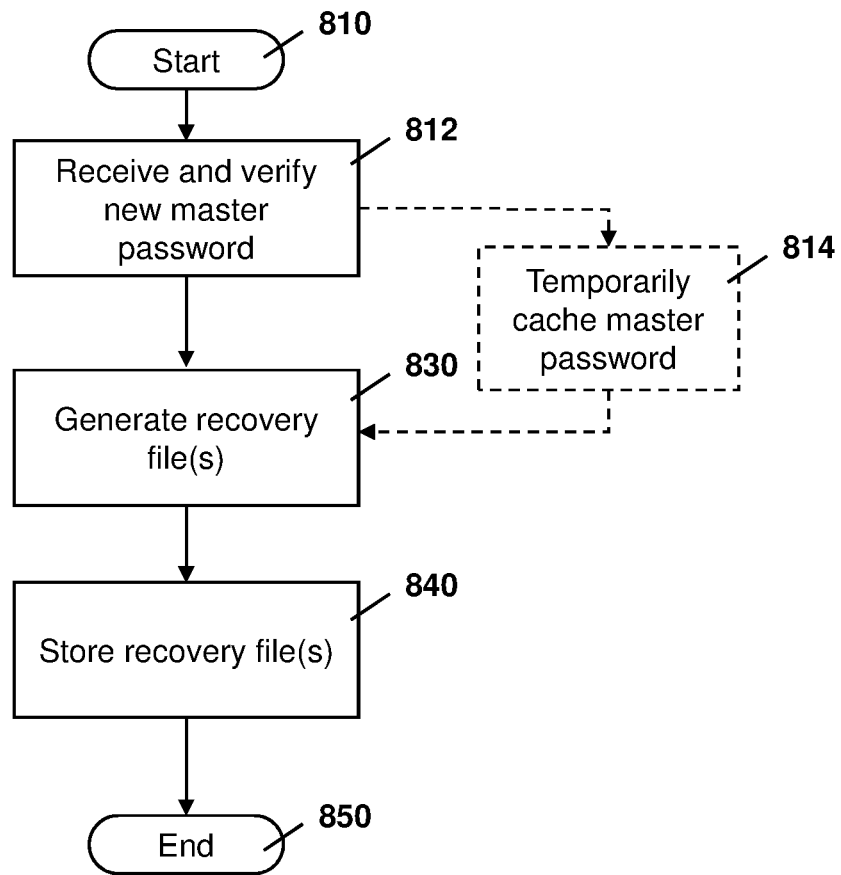
FIG. 8 is a process diagram showing a process for generating recovery files when the master password changes.

The embodiment of FIG. 4 shows an example when first creating the recovery mechanism or when reconfiguring the recovery mechanism to use different credentials or different selection credentials. If the vault key for the credential vault is changed, or if the recovery provides the master password and the master password has changed, the recovery files need to be recreated. Reference is now made to FIG. 8.

In the example of FIG. 8, the process starts at block 810 and proceeds to block 812. In block 812, the credential vault receives and verifies a new master password. Thus, the process of FIG. 8 may be run any time the master password has been changed.

From block 812, in one option the new master password may be temporarily cached as shown in block 814.

From block 812 or 814 the process proceeds to block 830 in which the recovery file or files are created. The recovery file or files may be created as described above with regard to FIGS. 6 and 7. Since the credentials utilized from the credential vault have already been selected and entropy has been verified, in one embodiment there is no need in the process of FIG. 8 to select new credentials.

Once the recovery file or files are generated at block 830, the process proceeds to block 840 in which the recovery files are stored for the credential vault. Again the recovery file or files may be stored locally or on a remote server. In the embodiment of FIG. 8, the storing of the recovery files replaces any currently stored recovery files.

The process then proceeds to block 850 and ends.

In accordance with another embodiment, new recovery files can be created when one of the credentials that was utilized in the generation of the recovery file is changed. For example, the user may have a new password for a social media account and updates this new password within the credential vault. If the password for the social media account was used for one or more recovery files, then the recovery files need to be updated.

Further, if the selection of credentials is based on a favorites list, or based on the most accessed applications or services, if the favorites list changes or if an application or service replaces another on the most accessed applications, then the recovery files may also be updated.

Figure 9:
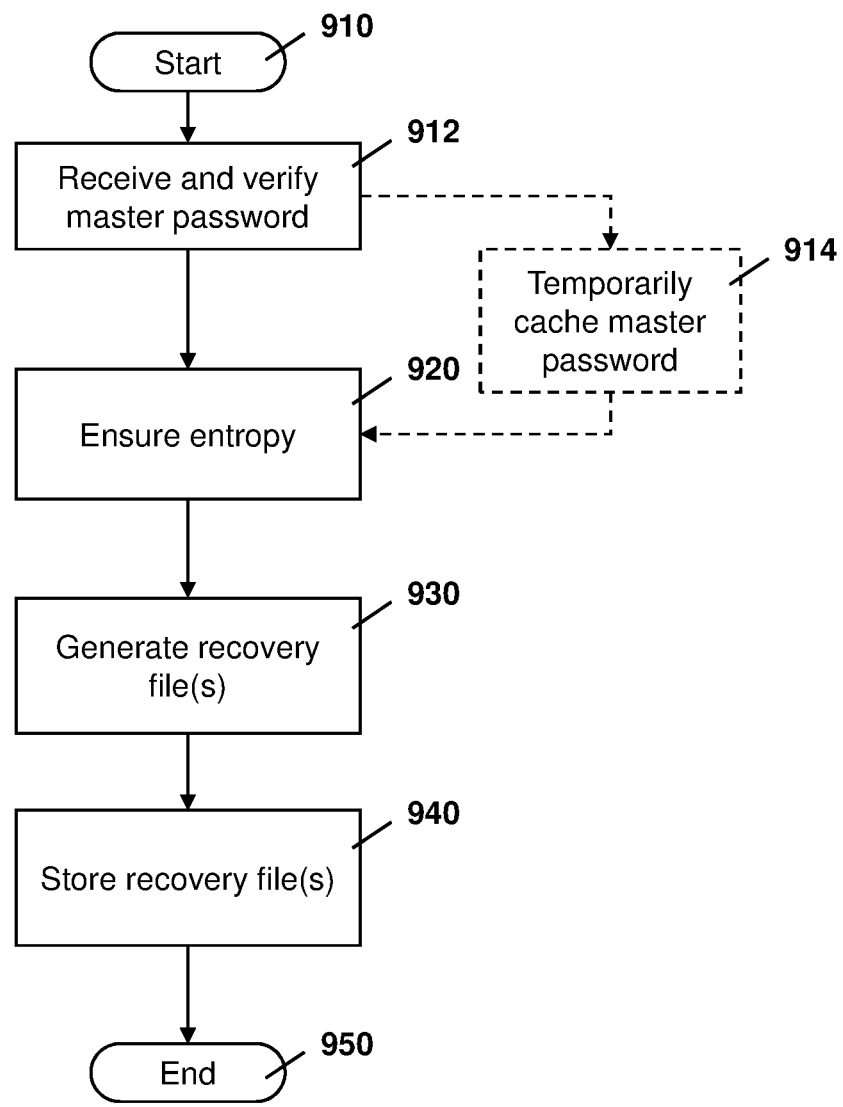
FIG. 9 is a process diagram showing a process for generating recovery files when a selected credential changes.

Reference is now made to FIG. 9.

The process of FIG. 9 starts at block 910 and proceeds to block 912 in which the process receives and verifies the master password. This may be done prior to the entry into the configuration mode, for example when the password for the social media account is being changed within the credential vault.

The master password or vault key may then be temporarily cached in one option, as shown by block 914.

From blocks 912 or 914, the process proceeds to block 920 and a check is made to ensure that the entropy for the recovery file still exists. For example, if the password for the social media account has been simplified then the minimum entropy for recovery of the master password or the vault key may fail to exist. In this case, the process may require that the user select alternative credentials or additional credentials in order to secure the recovery file.

Once the entropy is ensured at block 920, the process proceeds to block 930 in which the selected credentials or new credentials are used to generate the recovery file or files. Again, this may be done in accordance with FIG. 6 or 7, as described above.

The process then proceeds to block 940 in which the recovery files are stored locally or at a remote server. The newly generated recovery files replace existing recovery files that dealt with the changed credential.

From block 940 the process proceeds to block 950 and ends.

Access to the credential vault is then possible, even if the master password is forgotten. Specifically, in some embodiments, the recovery files can be used to provide the master password to the user. In other embodiments, the recovery process may unlock the credential vault, but require that the user change the master password. In this embodiment the recovery mechanism may not provide a user with the old master password.

Figure 10:
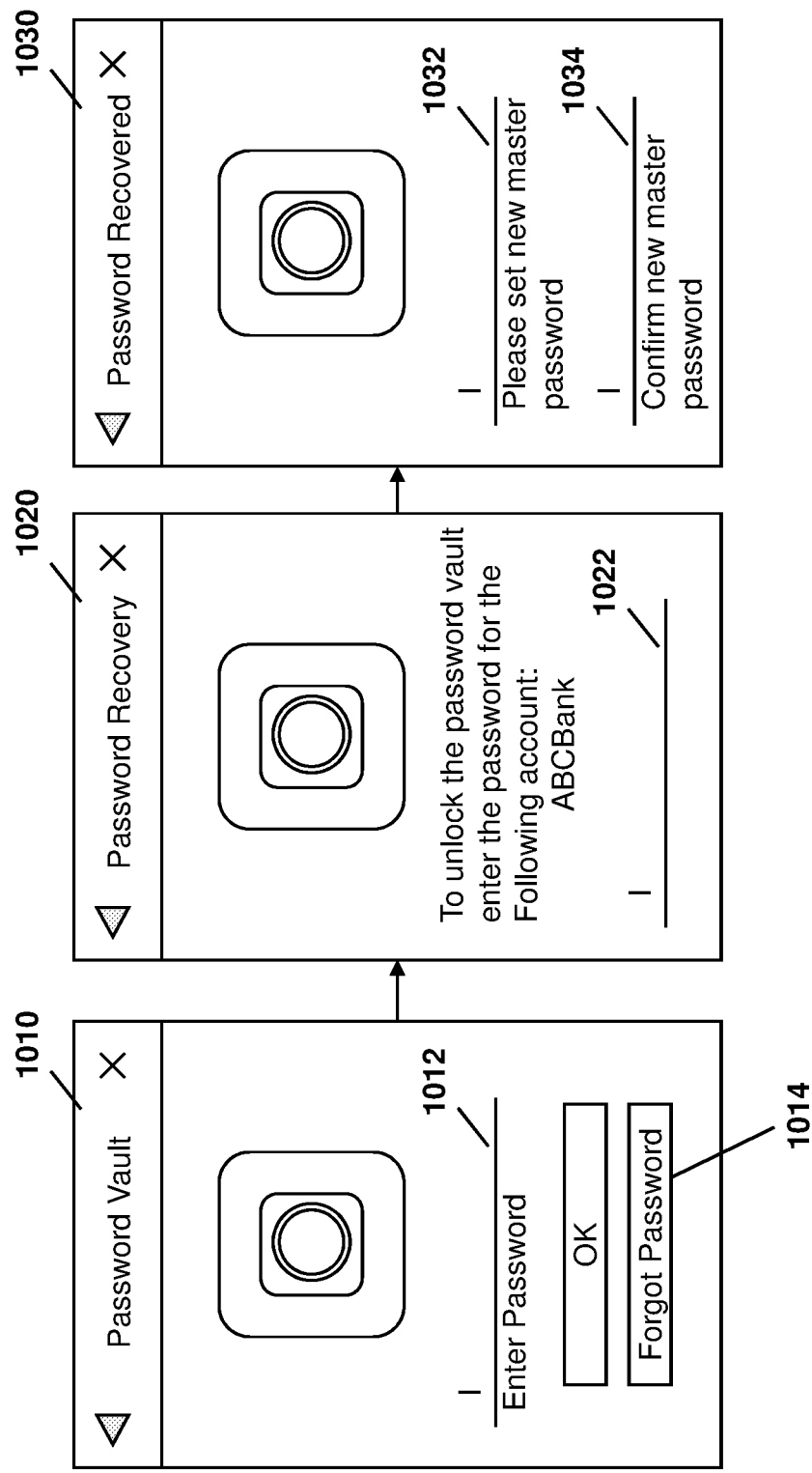
FIG. 10 is a series of screenshots showing password recovery for a credential vault.

Reference is now made to FIG. 10 which shows a series of screenshots for one example of password recovery or credential vault access.

In particular, as seen in FIG. 10, screen 1010 includes the credential vault entry screen. If a user knows the password for the credential vault, it can be entered at line 1012.

However, if the user has forgotten the password, forgot password button 1014 may be used to access the credential vault. Specifically, if the user presses button 1014, then a recovery screen such as screen 1020 may appear. Screen 1020 shows a password recovery screen in which the user is prompted to enter the password for one of the accounts within the credential vault.

While the screen 1020 asks for a password, other credentials from within the credential vault may be utilized, including user names, among other information.

In the case of screen 1020, the password recovery asks for the password for a bank account which may be entered at line 1022.

If a plurality of credentials is utilized to secure the master password recovery file, then a plurality of screens 1020 may be provided to the user in one embodiment, where each screen asks for the password for a particular account. Alternatively, the passwords may all be asked for on the same screen.

Further, prior to presenting the password recovery window 1020, the user may be provided with a selection window in which a selection may be made of which password or password combinations are to be used for password recovery. This may be done in the case, for example, when random credentials were utilized to create the recovery files. In this case, the user may be provided with a series of credentials which the user may need to remember and may select out of that list of credentials one or more for the password recovery.

Once the password recovery credential has been successfully input at line 1022, then a screen 1030 may be opened showing that access to the credential vault has been successfully granted. This may include recovery of the master password or of the vault key. In the embodiment of FIG. 10, a new master password may need to be set and confirmed at lines 1032 and 1034 respectively. However, this is merely optional.

The process of recovering the password involves retrieving the stored recovery file and decrypting the stored recovery file with the credentials input on screen 1020. The recovery file may then provide either the master password or vault key. If the master password is provided, then the master password may be run through the key derivation function from FIG. 1 in order to obtain the vault key.

Once the vault key is obtained, it can be used to decrypt the credential vault.

In one embodiment during recovery, if the wrong recovery password is entered for a recovery file after a certain number of attempts, the recovery file could be deleted. This may prevent attackers trying to access the credential vault using the recovery password. Such attacker may get N attempts for a particular recover file (or over all recovery files), and then the one or more of the recovery files could be removed to increase security.

Based on the above, the recovery is done using credentials within the credential vault. The recovery questions may be dynamically updated as the credentials are updated within the credential vault. Further, a third party never needs to know the master password or vault key in order to facilitate the recovery.

The modules and functionality described above may be performed on any computing device. One simplified diagram of a computing device is shown with regard to FIG. 11.

Figure 11:
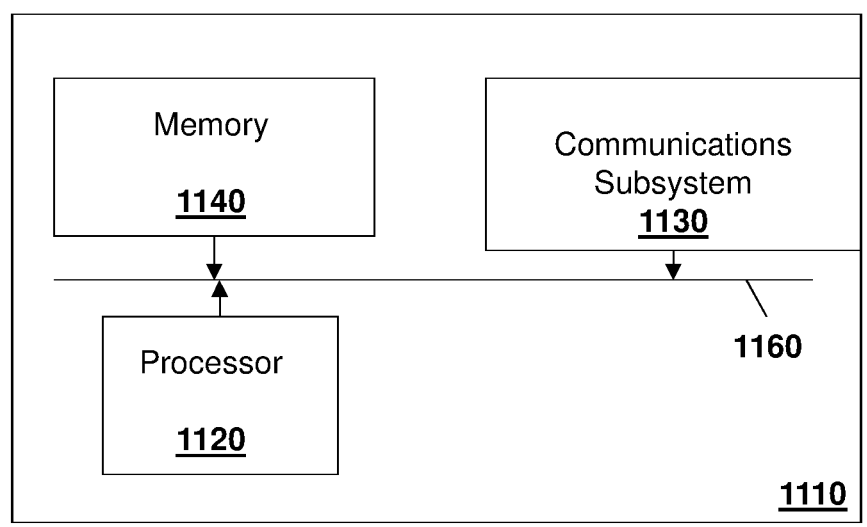
FIG. 11 is a block diagram of a simplified electronic device capable of being used with the methods and systems herein according to one embodiment.

In FIG. 11, device 1110 includes a processor 1120 and a communications subsystem 1130, where the processor 1120 and communications subsystem 1130 cooperate to perform the methods of the embodiments described above.

Processor 1120 is configured to execute programmable logic, which may be stored, along with data, on device 1110, and shown in the example of FIG. 11 as memory 1140. Memory 1140 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1140, device 1110 may access data or programmable logic from an external storage medium, for example through communications subsystem 1130.

Communications subsystem 1130 allows device 1110 to communicate with other devices or network elements.

Communications between the various elements of device 1110 may be through an internal bus 1160 in one embodiment. However, other forms of communication are possible.

Further, if computing device 1110 is a mobile device, one example device is described below with regard to FIG. 12.

Mobile device 1200 may comprise a two-way wireless communication device having voice or data communication capabilities or both. Mobile device 1200 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 1200 is enabled for two-way communication, it may incorporate a communication subsystem 1211, including a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate.

Network access requirements will also vary depending upon the type of network 1219. In some networks network access is associated with a subscriber or user of mobile device 1200. A mobile device may require a removable user identity module (RUIM) or a subscriber identity module (SIM) card in order to operate on a network. The SIM/RUIM interface 1244 is normally similar to a card-slot into which a SIM/RUIM card can be inserted and ejected. The SIM/RUIM card can have memory and hold many key configurations 1251, and other information 1253 such as identification, and subscriber related information. Without a SIM card, the mobile device may still be capable of limited functionality, including placing an emergency call.

When required network registration or activation procedures have been completed, mobile device 1200 may send and receive communication signals over the network 1219.

Figure 12:
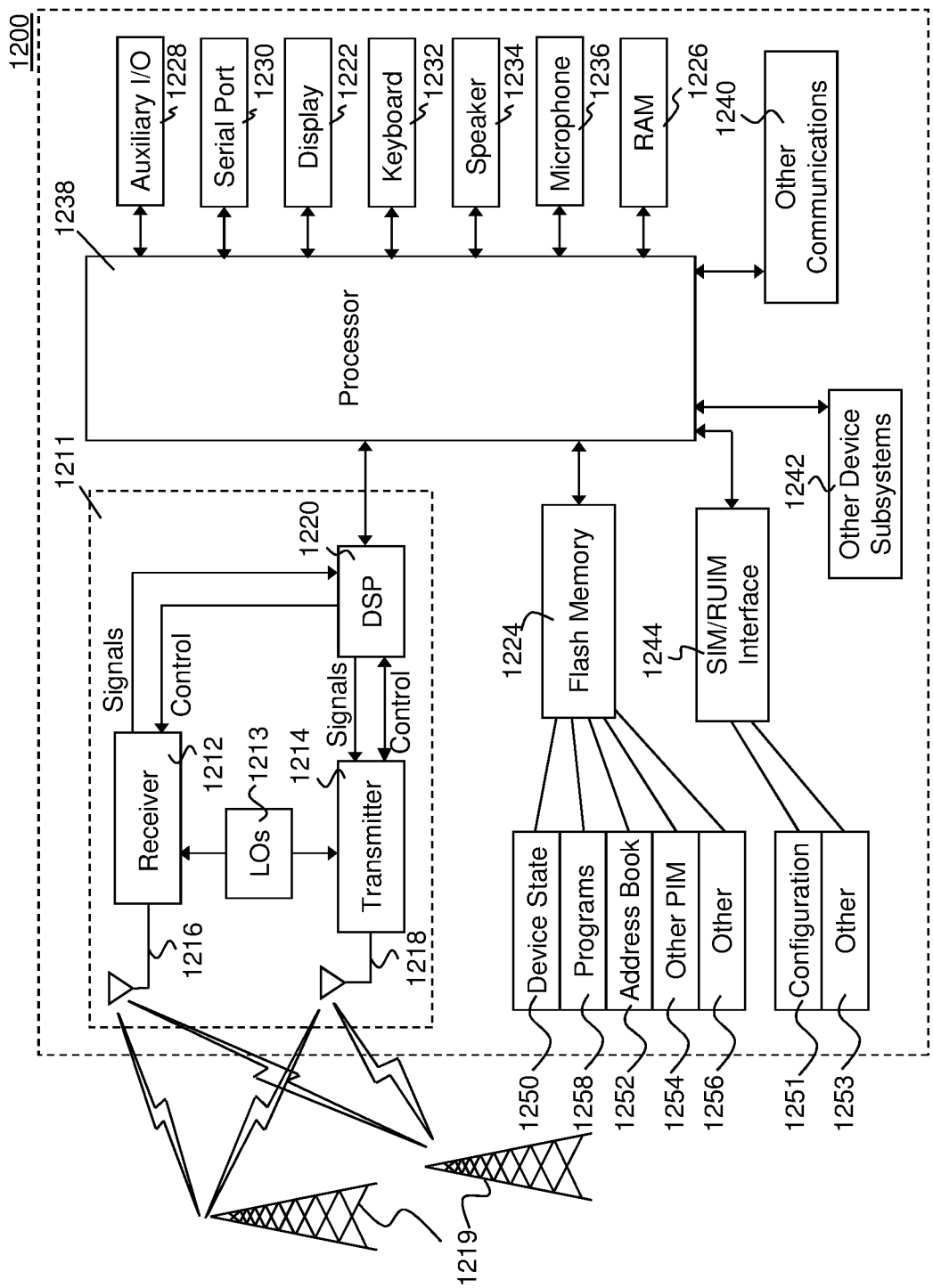
FIG. 12 is a block diagram of a mobile device according to one embodiment.

As illustrated in FIG. 12, network 1219 can include multiple base stations communicating with the mobile device.

Signals received by antenna 1216 through communication network 1219 are input to receiver 1212, which may perform such common receiver functions as signal amplification, frequency down conversion, filtering, channel selection and the like. Analog to digital (A/D) conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog (D/A) conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

Mobile device 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems, such as sensors, generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. On such program data storage may include a credential vault.

Processor 1238, in addition to its operating system functions, may enable execution of software applications on the mobile device. A predetermined set of applications that control basic operations, including at least data and voice communication applications for example, will normally be installed on mobile device 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including productivity applications, social media applications, games, among others, may also be loaded onto the mobile device 1200 through the network 1219, an auxiliary I/O subsystem 1228, serial port 1230, short-range communications subsystem or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of mobile device 1200 may also compose data items such as messages for example, using the keyboard 1232, which may be a complete alphanumeric keyboard or telephone-type keypad, either physical or virtual, among others, in conjunction with the display 1222 and possibly an auxiliary I/O device 1228. Such composed items may then be transmitted over a communication network through the communication subsystem 1211.

For voice communications, overall operation of mobile device 1200 is similar, except that received signals may typically be output to a speaker 1234 and signals for transmission may be generated by a microphone 1236. Alternative voice or audio I/O subsystems, such as a voice message recording subsystem, may also be implemented on mobile device 1200. Although voice or audio signal output is preferably accomplished primarily through the speaker 1234, display 1222 may also be used to provide an indication of the identity of a calling party, the duration of a voice call, or other voice call related information for example.

Serial port 1230 in FIG. 12 may be implemented in a mobile device for which synchronization with a user's desktop computer (not shown) may be desirable, but is an optional device component. Such a port 1230 may enable a user to set preferences through an external device or software application and may extend the capabilities of mobile device 1200 by providing for information or software downloads to mobile device 1200 other than through a wireless communication network. As will be appreciated by those skilled in the art, serial port 1230 can further be used to connect the mobile device to a computer to act as a modem or for charging a battery on the mobile device.

Other communications subsystems 1240, such as a short-range communications subsystem, is a further optional component which may provide for communication between mobile device 1200 and different systems or devices, which need not necessarily be similar devices. For example, the subsystem 1240 may include an infrared device and associated circuits and components or a Bluetooth™ communication module to provide for communication with similarly enabled systems and devices. Subsystem 1240 may further include non-cellular communications such as WiFi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for enabling access to a credential vault, the method comprising:
    selecting at least one credential, for encrypting at least one of a master password or a vault key, from within the credential vault, the at least one credential being associated with an application or service other than the credential vault, the selection of the at least one credential being done via a selection of an entry from a list of entries within the credential vault;
    encrypting one of the master password or the vault key for the credential vault with the selected at least one credential, thereby creating a recovery file; and
    storing the recovery file,
wherein the selected at least one credential can be used to decrypt the recovery file to enable access to the credential vault;
wherein the selecting ensures an entropy for the at least one credential is at least the same or greater than an entropy of the master password.

2. The method of claim 1, wherein the selecting is based on a selection received through a user interface of a computing device.

3. The method of claim 1, wherein the selecting is based on applications or services within the credential vault that have been accessed most frequently.

4. The method of claim 1, wherein the selecting is based on applications or services that have been most recently accessed.

5. The method of claim 1, wherein the selecting comprises choosing a plurality of credentials, and wherein the encrypting uses each of the plurality of credentials in turn to encrypt one of the master password or a vault key.

6. The method of claim 1, wherein the selecting comprises choosing a plurality of credentials, and wherein the encrypting creates a plurality of recovery files.

7. The method of claim 1, wherein the selecting further excludes credentials in an exclusion list.

8. The method of claim 1, further comprising replacing the recovery file with a new recovery file if the master password or the at least one credential have changed.

9. A computing device configured for enabling access to a credential vault, the computing device comprising:
    a processor; and
    a user interface,
wherein the computing device is configured to:
    select at least one credential, for encrypting at least one of a master password or a vault key, from within the credential vault, the at least one credential being associated with an application or service other than the credential vault, the selection of the at least one credential being done via a selection of an entry from a list of entries within the credential vault;
    encrypt one of the master password or the vault key for the credential vault with the selected at least one credential, thereby creating a recovery file; and
    store the recovery file,
wherein the selected at least one credential can be used to decrypt the recovery file to enable access to the credential vault;
wherein the selecting ensures an entropy for the at least one credential is at least the same or greater than an entropy of the master password.

10. The computing device of claim 9, wherein the computing device is configured to select based on a selection received through the user interface.

11. The computing device of claim 9, wherein the computing device is configured to select based on applications or services within the credential vault that have been accessed most frequently.

12. The computing device of claim 9, wherein the computing device is configured to select by choosing a plurality of credentials, and wherein the computing device encrypts using each of the plurality of credentials in turn to encrypt one of the master password or a vault key.

13. The computing device of claim 9, wherein the computing device is configured to select by choosing a plurality of credentials, and wherein the computing device encrypts by creates a plurality of recovery files.

14. The computing device of claim 9, wherein the computing device is configured to select by excluding credentials in an exclusion list.

15. The computing device of claim 9, wherein the computing device is further configured to replace the recovery file with a new recovery file if the master password or the at least one credential have changed.

16. A non-transitory computer readable medium for storing program instructions for enabling access to a credential vault, the program instructions, when executed by a processor of a computing device, cause the computing device to:
    select at least one credential, for encrypting one of a master password or a vault key, from within the credential vault, the at least one credential being associated with an application or service other than the credential vault, the selection of the at least one credential being done via a selection of an entry from a list of entries within the credential vault;
    encrypt one of the master password or the vault key for the credential vault with the selected at least one credential, thereby creating a recovery file; and
    store the recovery file,
wherein the selected at least one credential can be used to decrypt the recovery file to enable access to the credential vault;
wherein the selecting ensures an entropy for the at least one credential is at least the same or greater than an entropy of the master password.

* * * * *